US010273929B2

(12) United States Patent
Takei (10) Patent No.: US 10,273,929 B2
(45) Date of Patent: Apr. 30, 2019

(54) IGNITION TIMING CONTROL APPARATUS FOR INTERNAL COMBUSTION ENGINE (71) Applicant: TOYOTA JIDOSHA KABUSHIKI KAISHA, Toyota-shi (JP)

(72) Inventor: Takuya Takei, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 219 days.

(21) Appl. No.: 15/341,397

(22) Filed: Nov. 2, 2016

(65) Prior Publication Data
US 2017/0138328 A1 May 18, 2017

(30) Foreign Application Priority Data

Nov. 12, 2015 (JP) ................................. 2015-222322

(51) Int. Cl.
F02P 5/15 (2006.01)
F02P 7/06 (2006.01)

(52) U.S. Cl.
CPC .......... *F02P 5/1506* (2013.01); *F02P 5/1508* (2013.01); *F02P 7/06* (2013.01); *Y02T 10/46* (2013.01)

(58) Field of Classification Search
CPC .......... F02P 5/1506; F02P 5/1508; F02P 7/06; Y02T 10/46
USPC ...................................... 123/406.13; 701/103
See application file for complete search history.

(56) References Cited

U.S. PATENT DOCUMENTS

| 4,694,799 A * | 9/1987 | Yagi | F02D 35/023 123/406.42 |
|---|---|---|---|
| 5,271,367 A * | 12/1993 | Abe | F02P 3/0456 123/406.55 |
| 6,467,458 B1 * | 10/2002 | Suzuki | B60K 6/445 123/491 |
| 6,571,783 B1 * | 6/2003 | Denz | F02P 3/053 123/609 |
| 6,575,150 B2 * | 6/2003 | Katoh | F02D 41/009 123/406.5 |
| 6,799,556 B1 * | 10/2004 | Makino | F02P 5/1504 123/406.24 |
| 7,475,671 B1 * | 1/2009 | Fattic | F02D 35/026 123/406.47 |
| 7,561,957 B1 * | 7/2009 | Santoso | F02D 13/0246 701/113 |
| 2001/0025621 A1 * | 10/2001 | Shiraishi | B60W 10/06 123/305 |
| 2003/0034008 A1 * | 2/2003 | Katoh | F02D 41/009 123/406.5 |

(Continued)

FOREIGN PATENT DOCUMENTS

JP 59-15676 A 1/1984
JP 61-275573 A 12/1986
(Continued)

Primary Examiner — David E Hamaoui
Assistant Examiner — Susan E Scharpf
(74) Attorney, Agent, or Firm — Oblon, McClelland, Maier & Neustadt, L.L.P.

(57) ABSTRACT

When the concentration of alcohol is high, the timing of ignition is controlled upon the lapse of a delay time Tig from a reference timing t as a timing when a reference angle θref that is more advanced than a top dead center is detected. It should be noted, however, that the timing of ignition is controlled to a timing when a retarded angle aop is detected, if it is determined that a misfire has occurred.

8 Claims, 6 Drawing Sheets (56) References Cited

U.S. PATENT DOCUMENTS

2004/0216714 A1* 11/2004 Tayama ................ F02B 23/101
123/276
2015/0025779 A1* 1/2015 Uchida ................ F02D 41/009
701/104

FOREIGN PATENT DOCUMENTS

| JP | 2-37171 | 2/1990 |
| JP | 8-158999 A | 6/1996 |
| JP | 10-103206 A | 4/1998 |
| JP | 11-315741 A | 11/1999 |
| JP | 2003-56439 A | 2/2003 |
| JP | 2004-197702 | 7/2004 |
| JP | 2006-2618 | 1/2006 |
| JP | 2006-132438 A | 5/2006 |
| JP | 2009-13997 | 1/2009 |
| JP | 2009-24686 A | 2/2009 |
| JP | 2009-150365 A | 7/2009 |
| JP | 2010-156248 A | 7/2010 |

* cited by examiner

IGNITION TIMING CONTROL APPARATUS FOR INTERNAL COMBUSTION ENGINE

INCORPORATION BY REFERENCE

The disclosure of Japanese Patent Application No. 2015-222322 filed on Nov. 12, 2015 including the specification, drawings and abstract is incorporated herein by reference in its entirety.

BACKGROUND

1. Technical Field

The embodiment relates to an ignition timing control apparatus for an internal combustion engine. The ignition timing control apparatus is applied to an internal combustion engine that is equipped with a detection target that is provided with detected portions indicating a plurality of mutually different rotational angles of a crankshaft respectively, and a rotational angle sensor that detects a rotational angle of the crankshaft by detecting each of the detected portions. The ignition timing control apparatus is equipped with an angle command value setting process unit that sets an angle command value of an ignition timing in starting the internal combustion engine, and an operation process unit that controls the ignition timing of the internal combustion engine in accordance with the angle command value by operating an ignition device of the internal combustion engine.

2. Description of Related Art

For example, in Japanese Patent Application Publication No. 2009-13997 (JP 2009-13997 A), there is described an apparatus that advances an ignition timing more than a minimum advance for the best torque (an MBT) when the amount of fuel that has adhered to a wall surface in a cylinder is equal to or larger than a predetermined amount in starting an internal combustion engine.

SUMMARY

In starting an internal combustion engine, the rotational speed thereof is likely to fall due to the occurrence of a misfire. Then, when the rotational speed falls, the actual ignition timing is more advanced to an excessive extent than an ignition timing intended by control, and the in-cylinder pressure becomes excessively high before a piston moves past a top dead center. Thus, the torque preventing the internal combustion engine from rotating may exceed a starter torque to lock a starter.

The embodiment provides an ignition timing control apparatus for an internal combustion engine that can restrain a starter from being locked due to excessive advancement of an ignition timing.

An ignition timing control apparatus according to an aspect of the embodiment is designed for an internal combustion engine. The internal combustion engine includes a detection target and a rotational angle sensor. The detection target is provided with detected portions indicating a plurality of mutually different rotational angles of a crankshaft respectively. The rotational angle sensor is configured to detect a rotational angle of the crankshaft by detecting each of the detected portions. The ignition timing control apparatus includes an angle command value setting process unit and an operation process unit. The angle command value setting process unit is configured to set an angle command value of an ignition timing in starting the internal combustion engine. The operation process unit is configured to control the ignition timing of the internal combustion engine in accordance with the angle command value by operating an ignition device of the internal combustion engine. The ignition timing control apparatus is characterized as follows. The operation process unit includes a delay time setting process unit that is configured to set a delay time of a timing when the rotational angle of the crankshaft is assumed to become equal to the angle command value with respect to a reference timing, in accordance with the angle command value. The reference timing is a timing corresponding to a reference angle that is more advanced than a top dead center among timings of detection of the detected portions by the rotational angle sensor. The operation process unit is configured to control the ignition timing of the internal combustion engine to a timing upon lapse of the delay time from the reference timing when the angle command value does not coincide with any of rotational angles corresponding to the detection timings. The delay time setting process unit is configured to set the delay time based on a time interval among a plurality of the detection timings before setting the delay time. The delay time setting process unit includes a misfire determination process unit that is configured to determine whether or not a misfire has occurred in starting the internal combustion engine. The angle command value setting process unit includes a change process unit that is configured to change the angle command value of the ignition timing subsequent to detection of the misfire to a value that is more retarded than the angle command value at a time of the misfire on a condition that it be determined that the misfire has occurred.

In the aforementioned configuration, the delay time setting process unit sets the delay time from the detection timing of the detected portion at the reference angle that is more advanced than the top dead center, and the operation process unit controls the ignition timing to the timing upon the lapse of the delay time. It should be noted herein that the delay time is set based on the time interval among the detection timings before the setting of the delay time. This time interval indicates the rotational speed of the crankshaft. Accordingly, the delay time is set in accordance with the rotational speed of the crankshaft in the past.

By the way, in starting the internal combustion engine, the rotational speed of the crankshaft tends to drastically fall even through the occurrence of a single misfire. Accordingly, when the rotational speed at and after the reference timing drastically falls due to the occurrence of a misfire, the delay time does not reflect the actual rotational speed, but assumes a value suited for a rotational speed that is higher than the actual rotational speed. In this case, the timing upon the lapse of the delay time may become earlier to an excessive extent than the timing when the rotational angle becomes equal to the angle command value. Then in this case, the ignition timing becomes equal to a timing that is excessively advanced with respect to the top dead center, and hence the starter may be locked.

Thus, in the aforementioned configuration, the change process unit changes the angle command value to a value that is more retarded than the angle command value at the time of a misfire, on the condition that the misfire determination process unit determine that a misfire has occurred. Thus, the ignition timing can be restrained from becoming equal to a timing that is excessively retarded with respect to the top dead center, and hence the starter can be restrained from being locked through excessive advancement of the ignition timing.

In the aforementioned configuration, the change process unit may be configured to change the angle command value of the ignition timing subsequent to detection of the misfire to a value that is more retarded than the angle command value at the time of the misfire by setting the angle command value to a retarded angle. The retarded angle is a rotational angle that is determined by the detected portion that is located more retarded than the reference angle. The operation process unit may be configured to control the ignition timing to a retarded detection timing as the detection timing of the retarded angle, regardless of the delay time that is set by the delay time setting process unit, when the angle command value is equal to the retarded angle.

In the aforementioned configuration, the process of making a change toward retardation is the process of controlling the ignition timing to the retarded detection timing, which is a timing that is more retarded than the reference timing. Therefore, when the process of making a change toward retardation is executed, the ignition timing can be set without being influenced by an error included in the delay time that is set in accordance with the rotational speed in the past. Therefore, the controllability of the ignition timing at the time when the process of making a change toward retardation is executed can be made higher than in the case where the ignition timing is controlled based on the delay time from the reference timing.

In the aforementioned configuration, the ignition timing control apparatus may include a degree-of-ease information acquisition process unit that is configured to acquire degree-of-ease information as information indicating whether or not a degree of ease of gasification, which is an ease with which a fuel injected from a fuel injection valve of the internal combustion engine gasifies as a result of a component or components of the fuel, is smaller than a prescribed value. The degree of ease of gasification indicates that the fuel is more unlikely to gasify when the degree of ease of gasification is smaller than the prescribed value than when the degree of ease of gasification is equal to or larger than the prescribed value. The angle command value setting process unit may be configured to set the angle command value more advanced than the retarded angle on a condition that the degree of ease of gasification based on the degree-of-ease information be smaller than the prescribed value. The angle command value setting process unit may be configured to set the angle command value to the retarded angle on a condition that the degree of ease of gasification based on the degree-of-ease information be equal to or larger than the prescribed value.

In the case of a fuel whose degree of ease of gasification is smaller than the prescribed value, it is effective to set the angle command value advanced in compensating for a fall in ignitability resulting from the unlikeliness of gasification. From this point of view, in the aforementioned configuration, the angle command value is more advanced than the retarded angle on the condition that the degree of ease of gasification be smaller than the prescribed value. On the other hand, when the degree of ease of gasification is equal to or larger than the prescribed value, the angle command value is set to the retarded angle. Accordingly, in the case of a fuel that is likely to gasify, the possibility of the starter being locked can be reduced to the utmost, by identifying the angle command value with the retarded angle.

In the aforementioned configuration, the angle command value setting process unit may be configured to set the angle command value more advanced than the retarded angle when the degree of ease of gasification based on the degree-of-ease information is smaller than the prescribed value and a temperature of a coolant in the internal combustion engine is lower than a predetermined temperature. The angle command value setting process unit may be configured to set the angle command value to the retarded angle on a condition that the temperature of the coolant be equal to or higher than the predetermined temperature even when the degree of ease of gasification is smaller than the prescribed value.

When the temperature of the coolant is equal to or higher than the predetermined temperature, gasification of the fuel injected from the fuel injection valve is accelerated. Therefore, in the aforementioned configuration, the angle command value is more advanced than the retarded angle when the degree of ease of gasification is smaller than the prescribed value and the temperature of the coolant in the internal combustion engine is lower than the predetermined temperature. Then, the possibility of the starter being locked can be reduced to the utmost by identifying the angle command value with the retarded angle on the condition that the fuel be likely to gasify.

In the aforementioned configuration, the angle command value setting process unit may be configured to make an amount of advancement with respect to the top dead center larger when a rotational speed of the crankshaft is high than when the rotational speed of the crankshaft is low, in setting the angle command value more advanced than the retarded angle.

The time required for rotation by a predetermined rotation amount is shorter when the rotational speed is high than when the rotational speed is low. Therefore, the rotation amount is large when flames sufficiently spread. Accordingly, the risk of the starter being locked falls even in the case where the angle command value is more advanced when the rotational speed is high than when the rotational speed is low. It should be noted, however, that if a misfire occurs in the case where the angle command value is set more advanced when the rotational speed is high, the rotational speed at the ignition timing may become lower to an excessive extent than the rotational speed at the time when the angle command value is set. Then in this case, the angle command value is advanced for the low rotational speed. Accordingly, in the aforementioned configuration, the actual ignition timing is likely to be excessively advanced when a misfire occurs. Therefore, the utility value of the aforementioned change process unit is especially great.

In the aforementioned configuration, the ignition timing control apparatus may include a completion determination process unit that is configured to determine that start of the internal combustion engine is completed when the rotational speed of the crankshaft becomes equal to or higher than a predetermined rotational speed. The change process unit may be configured to refrain from executing a process of changing the angle command value to the more retarded value as a result of a determination that is made by the misfire determination process unit when a misfire has occurred, when the rotational speed of the crankshaft is equal to or higher than a threshold speed. The threshold speed is lower than the predetermined rotational speed.

The amount of fall in rotational speed resulting from a misfire is smaller when the rotational speed is high than when the rotational speed is low. Besides, the starter is unlikely to be locked even when the ignition timing is advanced. Therefore, in the aforementioned configuration, when the rotational speed is equal to or higher than the threshold speed, the process of making a change toward retardation as a result of a determination that a misfire has occurred is not executed. Thus, the ignition timing can be advanced to the utmost.

In the aforementioned configuration, the detection timings include an advanced detection timing as the detection timing corresponding to the detected portion that is more advanced than the reference angle by a prescribed angular interval. The delay time setting process unit may be configured to calculate a product of an instantaneous rotation time and a quotient as the delay time, the instantaneous rotation time may be a time interval from the advanced detection timing to the reference timing, the quotient may be a value obtained by dividing an angular interval between the angular command value and the reference angle by the prescribed angular interval.

In the aforementioned configuration, the aforementioned delay time is set by the aforementioned product, by regarding the rotational speed of rotation from the reference angle to the angle command value as equal to the average of the rotational speeds from the advanced detection timing to the reference timing. That is, if the rotational speed is regarded as equal to the average, the ratio between the time required for rotation from the reference angle to the angle command value and the aforementioned instantaneous rotation time is considered to be equal to the ratio between the angular interval from the reference angle to the angle command value and the prescribed angular interval. Therefore, the delay time can be set by the aforementioned product.

In this case, however, when the rotational speed in the angular range from the reference angle to the angle command value drastically falls due to a misfire, the rotational speed upon the lapse of the delay time may be located more advanced to an excessive extent than the angle command value. Therefore, the utility value of the aforementioned change process unit is especially great.

In the aforementioned configuration, the misfire determination process unit may be configured to determine whether or not a misfire has occurred, based on a difference between an average rotational speed of the crankshaft in a first predetermined angular range and an average rotational speed of the crankshaft in a second predetermined angular range. The first predetermined angular range is an angular range where the rotational speed of the crankshaft is assumed to rise in connection with discharge of the ignition device in a cylinder subjected to a determination on occurrence of a misfire, based on a detected value of a rotational angle of the crankshaft of the internal combustion engine. The second predetermined angular range is an angular range before the rotational speed of the crankshaft is assumed to rise.

If no misfire has occurred, the average rotational speed in the predetermined angular range where the rotational speed of the crankshaft is assumed to rise is considered to be higher than the average rotational speed in the predetermined angular range before the rotational speed of the crankshaft is assumed to rise. On the other hand, if a misfire has occurred, the average rotational speed in the predetermined angular range where the rotational speed of the crankshaft is assumed to rise is considered to be lower than the average rotational speed in the predetermined angular range before the rotational speed of the crankshaft is assumed to rise. Focusing attention on this point, the misfire determination process unit determines whether or not a misfire has occurred.

The aspect of the embodiment can also be defined as follows. An ignition timing control apparatus for an internal combustion engine is designed for an internal combustion engine. The internal combustion engine includes a detection target and a rotational angle sensor. The detection target is provided with detected portions indicating a plurality of mutually different rotational angles of a crankshaft respectively. The rotational angle sensor is configured to detect a rotational angle of the crankshaft by detecting each of the detected portions. The ignition timing control apparatus is equipped with an electronic control unit. The electronic control unit is configured to i) set an angle command value of an ignition timing in starting the internal combustion engine, ii) control the ignition timing of the internal combustion engine in accordance with the angle command value by operating an ignition device of the internal combustion engine, iii) set a delay time of a timing when the rotational angle of the crankshaft is assumed to become equal to the angle command value with respect to a reference timing, in accordance with the angle command value, the reference timing being a timing corresponding to a reference angle that is more advanced than a top dead center among timings of detection of the detected portions by the rotational angle sensor, iv) control the ignition timing of the internal combustion engine to a timing upon lapse of the delay time from the reference timing when the angle command value does not coincide with any of rotational angles corresponding to the detection timings, v) set the delay time based on a time interval among a plurality of the detection timings before setting the delay time, vi) determine whether or not a misfire has occurred in starting the internal combustion engine, and vii) change the angle command value of the ignition timing subsequent to detection of the misfire to a value that is more retarded than the angle command value at a time of the misfire when the electronic control unit determines that the misfire has occurred.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
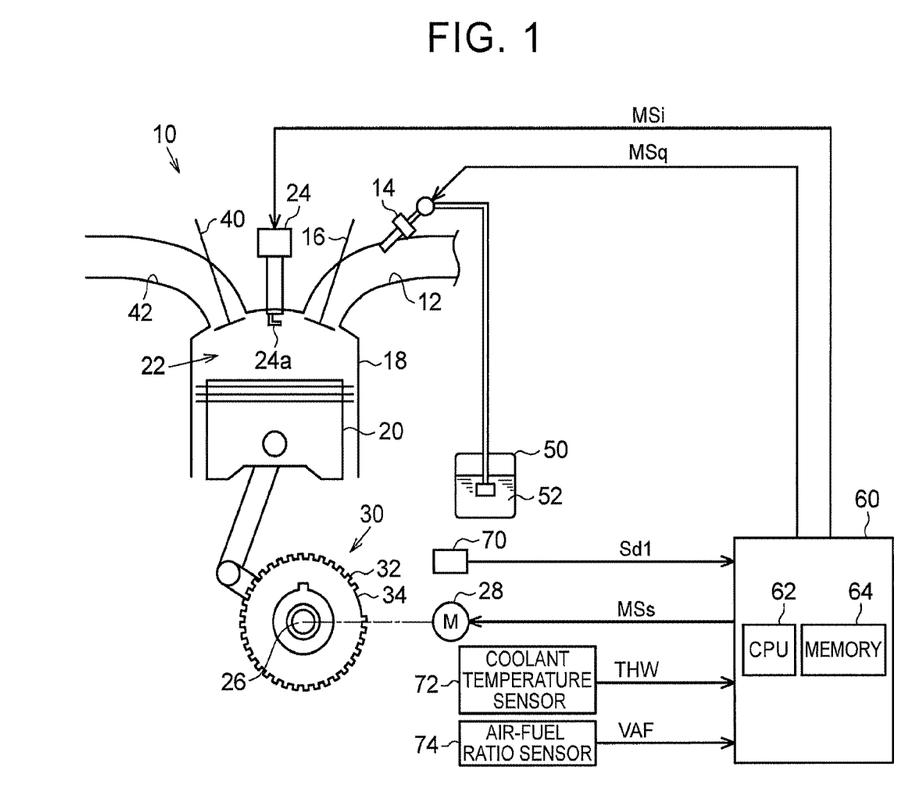
FIG. 1 is a view showing an ignition timing control apparatus for an internal combustion engine according to one of the embodiments and the internal combustion engine.

An ignition control apparatus for an internal combustion engine according to one embodiment will be described hereinafter with reference to the drawings. An internal combustion engine 10 shown in FIG. 1 has four cylinders. The internal combustion engine 10 is an in-vehicle prime mover that applies motive power for running to driving wheels of a vehicle. The vehicle is equipped with only the internal combustion engine 10 as an in-vehicle prime mover that applies motive power to the driving wheels. As shown in FIG. 1, an intake passage 12 of the internal combustion engine 10 is provided with a fuel injection valve 14. An air-fuel mixture containing air sucked into the intake passage 12 and fuel injected by the fuel injection valve 14 is sucked into a combustion chamber 22 that is compartmentalized by a cylinder 18 and a piston 20, through an opening operation of an intake valve 16. The combustion chamber 22 is provided with an ignition plug 24a of an ignition device 24. When the air-fuel mixture in the combustion chamber 22 burns due to a discharge current flowing between both electrodes of the ignition plug 24a, combustion energy is converted into rotational energy of a crankshaft 26 via the piston 20. Then, the air-fuel mixture that has contributed to combustion is discharged to an exhaust passage 42 as exhaust gas, in connection with an opening operation of an exhaust valve 40.

An electronically controlled starter motor 28 that applies a turning force to the crankshaft 26 is coupled to the crankshaft 26. Besides, a timing rotor 30 that is provided with tooth portions 32 indicating a plurality of rotational angles of the crankshaft 26 respectively is linked with the crankshaft 26. The timing rotor 30 is provided with the tooth portions 32 basically at intervals of 10° CA. However, the timing rotor 30 is provided with a single missing tooth portion 34 as a location where the interval between adjacent ones of the tooth portions 32 is 30° CA. This is because of the purpose of indicating a reference rotational angle of the crankshaft 26.

A fuel 52 that is injected from the fuel injection valve 14 is stored in a fuel tank 50. The fuel 52 is obtained by mixing gasoline fuel and alcohol fuel with each other at a predetermined ratio. It should be noted, however, that the ratio mentioned herein includes a case where the ratio of one of the fuels is zero, for example, a case where the ratio of alcohol fuel is zero.

The ignition timing control apparatus (a control unit (an electronic control unit) 60) operates various actuators such as the fuel injection valve 14, the ignition device 24, the starter motor 28 and the like, with a view to controlling controlled variables (exhaust gas components and a torque) of the internal combustion engine 10. That is, the ignition timing control apparatus operates the fuel injection valve 14 by outputting an operation signal MSq to the fuel injection valve 14, operates the ignition device 24 by outputting an operation signal MSi to the ignition device 24, and operates the starter motor 28 by outputting an operation signal MSs to the starter motor 28. In controlling the controlled variables, the control unit 60 fetches an output (a first detection signal Sd1) of a rotational angle sensor 70 that detects a rotational angle of the crankshaft 26, a temperature (a coolant temperature THW) of a coolant in the internal combustion engine 10 detected by a coolant temperature sensor 72, and an output signal VAF of an air-fuel ratio sensor 74 that detects an air-fuel ratio of the air-fuel mixture contributing to combustion in the combustion chamber 22 based on components of exhaust gas. The control unit 60 is equipped with a central processing unit (a CPU 62) and a memory 64.

Figure 2:
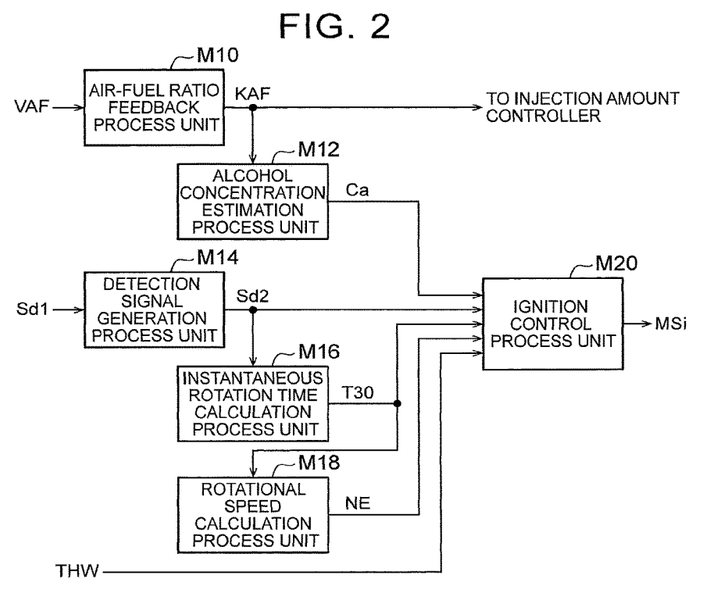
FIG. 2 is a block diagram showing some of processes that are executed by the control apparatus according to the embodiment.

FIG. 2 shows some of processes that are realized through the execution of a program stored in the memory 64 by the CPU 62, according to the types of the processes. An air-fuel ratio feedback process unit M10 calculates a correction coefficient KAF as a manipulated variable for controlling the air-fuel ratio of the air-fuel mixture in the combustion chamber 22 to a target air-fuel ratio through feedback, based on the output signal VAF of the air-fuel ratio sensor 74, and outputs the calculated correction coefficient KAF. The calculation of the correction coefficient KAF is carried out based on a difference between a value of the output signal VAF and an output value corresponding to the target air-fuel ratio. The correction coefficient KAF is a correction coefficient for a base value of an amount of fuel injected from the fuel injection valve 14. The amount of injected fuel is corrected in an increasing manner as the correction coefficient KAF increases. The correction coefficient KAF is fetched by an injection amount controller that generates the aforementioned operation signal MSq and an alcohol concentration estimation process unit M12.

The alcohol concentration estimation process unit M12 calculates an alcohol concentration Ca in the fuel 52 based on the correction coefficient KAF at the time when the target air-fuel ratio is set to a theoretical air-fuel ratio, and outputs the calculated alcohol concentration Ca. In this case, the alcohol concentration Ca is calculated as a value that rises as the correction coefficient KAF increases. Incidentally, for example, when the correction coefficient KAF is not input to the alcohol concentration estimation process unit M12, the alcohol concentration estimation process unit M12 holds the alcohol concentration Ca calculated earlier, and outputs the held alcohol concentration Ca as a concentration of alcohol in the fuel 52 that is currently injected from the fuel injection valve 14.

Figure 3:
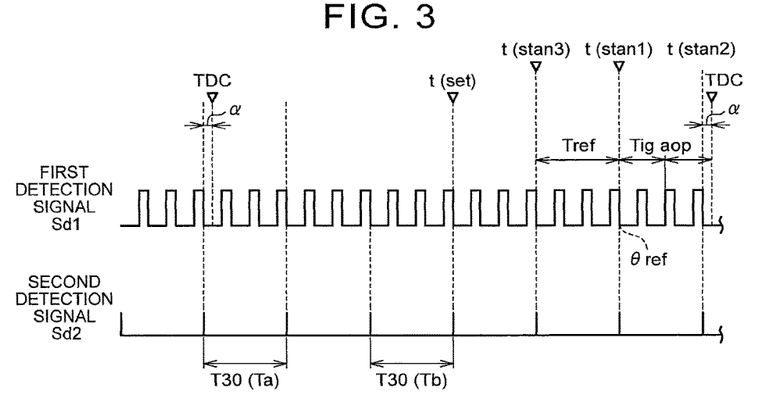
FIG. 3 is a time chart showing how a detection signal of a crank angle changes according to the embodiment.

A detection signal generation process unit M14 generates a second detection signal Sd2 based on the first detection signal Sd1 that is output by the rotational angle sensor 70, and outputs the generated second detection signal Sd2. FIG. 3 shows how the first detection signal Sd1 and the second detection signal Sd2 change. As shown in FIG. 3, while the first detection signal Sd1 is a pulse signal that periodically emerges at intervals of 10° CA, the second detection signal Sd2 is a pulse signal that is obtained by thinning the first detection signal Sd1 as the pulse signal and that emerges at intervals of 30° CA. For more details, the second detection signal Sd2 is a signal indicating a falling edge of the pulse signal as the first detection signal Sd1 that emerges at intervals of 30° CA. Besides, the second detection signal Sd2 includes a pulse signal indicating a falling edge of the first detection signal Sd1 corresponding to each of a pair of the tooth portions 32 that sandwich the missing tooth portion 34. Each timing when the pulse signal as the second detection signal Sd2 is generated is utilized to control an ignition timing, as a timing of detection of each of the tooth portions 32 by the rotational angle sensor 70. Incidentally, some reference symbols shown in FIG. 3 will be utilized for later description.

Referring back to FIG. 2, an instantaneous rotation time calculation process unit M16 sporadically calculates an instantaneous rotation time T30 as a time required for rotation by 30° CA, which is an interval between a pair of adjacent pulses of the second detection signal Sd2. A rotational speed calculation process unit M18 calculates a rotational speed NE based on the instantaneous rotation time T30 corresponding to 360° CA.

An ignition control process unit M20 calculates the operation signal MSi to control the ignition timing, based on the alcohol concentration Ca, the second detection signal Sd2, the instantaneous rotation time T30, the rotational speed NE and the coolant temperature THW, and outputs the calculated operation signal MSi to the ignition device 24.

Figure 4:
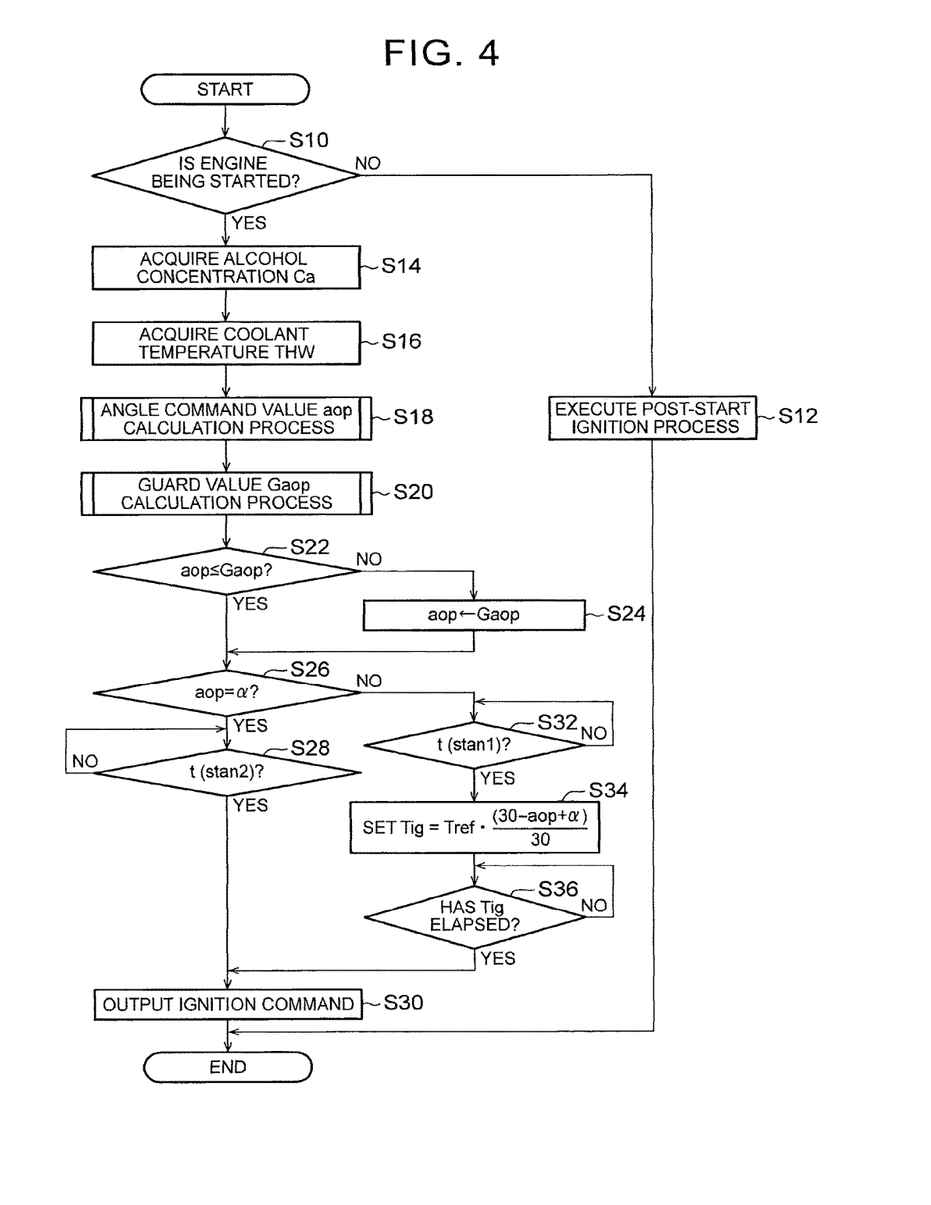
FIG. 4 is a flowchart showing a process that is executed by an ignition timing control process unit according to the embodiment.

FIG. 4 shows a process that is executed by the ignition control process unit M20. This process is repeatedly executed every time a set timing t(set) shown in FIG. 3 as a timing of "90+α° BTDC" in each of the cylinders arrives.

Incidentally, the CPU 62 will be treated hereinafter as a subject, for the sake of convenience.

In this series of processing procedures, the CPU 62 first determines whether or not the internal combustion engine is being started (S10). It should be noted herein that the completion of start of the internal combustion engine means that the rotational speed NE becomes equal to or higher than a predetermined rotational speed NEc. That is, during a period from a time point at which the starter motor 28 is activated to start rotating the crankshaft 26 to a time point immediately before the attainment of the predetermined rotational speed NEc by the rotational speed NE through combustion of the fuel 52 in the internal combustion engine 10, the CPU 62 determines that the internal combustion engine is being started. Incidentally, the CPU 62 continues to drive the starter motor 28 while the internal combustion engine is being started. Besides, in the present embodiment, the predetermined rotational speed NEc is set equal to or higher than a speed corresponding to about 70 to 80% of a target rotational speed of idling rotational speed control.

If it is determined that the internal combustion engine is not being started (NO in S10), the CPU 62 performs the control of the ignition timing after the start of the internal combustion engine (S12). This control may be performed in such a manner as to make an actual ignition timing as close as possible to an MBT as an ignition timing when the generation efficiency of torque is maximized. In concrete terms, a process of controlling the actual ignition timing to the more retarded one of two ignition timings, namely, the MBT and a trace knock ignition timing as an advancement limit of the ignition timing when the occurrence of knocking can be avoided may be executed. It should be noted, however, that idling rotational speed control is performed when no torque is required to be applied to the driving wheels if it is determined that the start of the internal combustion engine is completed. Therefore, the ignition timing may be manipulated as a manipulated variable for controlling the rotational speed NE to the target rotational speed of idling rotational speed control.

On the other hand, if it is determined that the internal combustion engine is being started (YES in S10), the CPU 62 acquires the alcohol concentration Ca (S14). Subsequently, the CPU 62 acquires the coolant temperature THW (S16). Subsequently, the CPU 62 calculates a command value (an angle command value aop) of the ignition timing specified by the rotational angle of the crankshaft 26 (S18).

Figure 5:
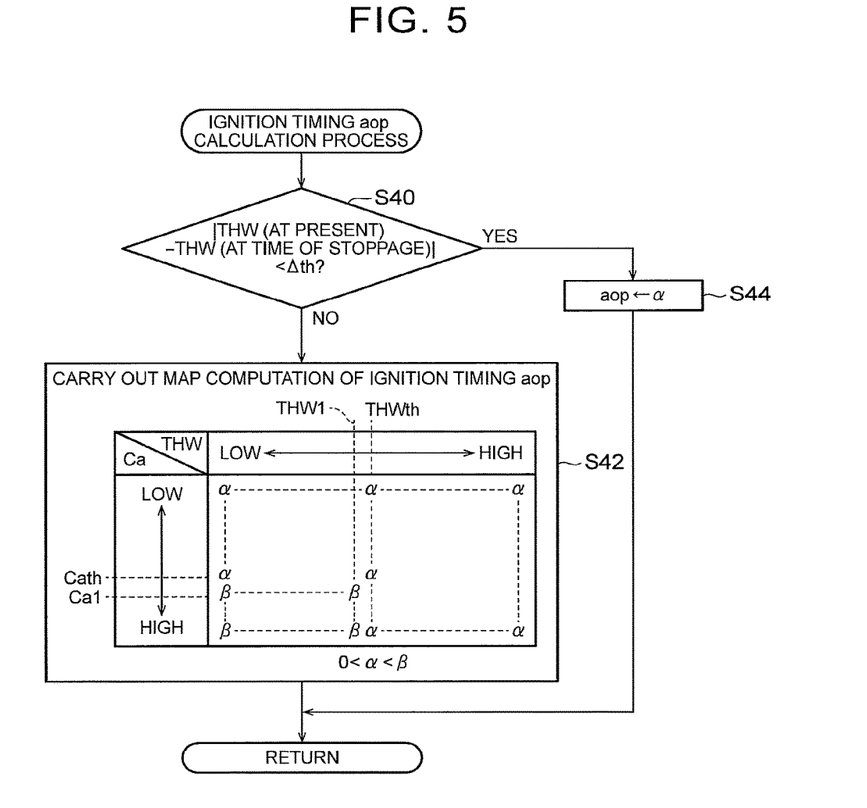
FIG. 5 is a flowchart showing a process of calculating an angle command value according to the embodiment.

FIG. 5 shows the procedure of a process of calculating the angle command value aop. Incidentally, in the present embodiment, the angle command value aop determines an amount of advancement from a top dead center. That is, the CPU 62 determines whether or not the absolute value of a difference between the current coolant temperature THW and the coolant temperature THW at the time of last stoppage of the internal combustion engine 10 is smaller than a prescribed value $\Delta$th. This processing procedure is intended to determine whether or not the time from the stoppage of the internal combustion engine 10 to the current start thereof is short, the temperature of an inner wall surface of the cylinder 18 is high to a certain extent, and gasification of the fuel 52 injected from the fuel injection valve 14 is accelerated. The prescribed value $\Delta$th is set based on an upper limit of the absolute value of an amount of fall in the coolant temperature THW in the case where the time of stoppage of the internal combustion engine 10 is equal to a time when the temperature of the inner wall surface of the cylinder 18 does not considerably fall from the temperature thereof at the time of last operation of the internal combustion engine 10. Incidentally, the coolant temperature THW at the time of stoppage is stored into the memory 64 through a post-processing that is executed by the CPU 62 before a power supply of the control unit 60 is turned off due to, for example, the turning off of an activation switch of the vehicle.

Then, if it is determined that the absolute value of the difference is smaller than the prescribed value $\Delta$th (YES in S40), the CPU 62 assumes that the time from the stoppage of the internal combustion engine 10 to the current start thereof is short and that the temperature of the inner wall surface of the cylinder 18 is high to a certain extent, and identifies the angle command value aop with a retarded angle $\alpha$ with a small amount of advancement (e.g., 2 to 8° CA) (S44). As shown in FIG. 3, the retarded angle $\alpha$ is set to a rotational angle corresponding to the pulse signal as the second detection signal Sd2. As a prerequisite for this setting, in the present embodiment, the tooth portions 32 are arranged respectively at rotational angles advanced from the top dead center of each of the cylinders by the retarded angle $\alpha°$.

On the other hand, if the absolute value of the difference is equal to or larger than the prescribed value $\Delta$th (NO in S40), the CPU 62 carries out map computation of the angle command value aop based on the alcohol concentration Ca and the coolant temperature THW (S42). FIG. 5 shows map data for use in map computation. The map data are stored in advance in the memory 64. As shown in FIG. 5, the map data determine the angle command value aop at the time when each of the alcohol concentration Ca and the coolant temperature THW is equal to one of a plurality of discrete values.

In particular, in the present embodiment, when the coolant temperature THW is equal to or higher than a predetermined temperature THWth or when the alcohol concentration Ca is equal to or lower than a prescribed concentration Cath, the angle command value aop is identified with the aforementioned retarded angle $\alpha$. Besides, when the coolant temperature THW is equal to or lower than a specific temperature THW1 that is lower than the predetermined temperature THWth and the alcohol concentration Ca is equal to or higher than a specific concentration Ca1 that is higher than the prescribed concentration Cath, the angle command value aop is identified with a predetermined value $\beta$ that is larger than the retarded angle $\alpha$. This takes into account that the ignitability of the fuel 52 is lower when the alcohol concentration Ca is high than when the alcohol concentration Ca is low in a region where the coolant temperature THW is lower than the predetermined temperature THWth. That is, alcohol fuel is more unlikely to gasify than gasoline fuel, and hence exhibits low ignitability. Then, in the case of low ignitability, a long time is required until flames sufficiently spread to the entire combustion chamber 22, so the ignition timing is set more advanced. Incidentally, the reason why the angle command value aop is identified with the retarded angle $\alpha$ that is more retarded than the predetermined value $\beta$, for example, when the coolant temperature THW is equal to or higher than the predetermined temperature THWth lies in the purpose of restraining the starter from being locked. That is, when the ignition timing is set more advanced than the top dead center in starting the internal combustion engine 10, a force displacing the piston 20 in such a manner as to enlarge the volume of the interior of the combustion chamber 22 acts on the piston 20, and hence may become a torque preventing the crankshaft 26 from rotating, before the top dead center. Incidentally, the predetermined value $\beta$ is set to a value between "$\alpha+30°$ BTDC" and "$\alpha°$ BTDC".

When the alcohol concentration Ca and the coolant temperature THW coincide with one of a plurality of combinations of input variables of the map data, the CPU 62 identifies a value of a corresponding output variable with the angle command value aop. In contrast, when the alcohol concentration Ca and the coolant temperature THW do not coincide with any one of the plurality of the combinations of the input variables of the map data, the CPU 62 calculates the angle command value aop through interpolation computation. That is, for example, when the coolant temperature THW is lower than the predetermined temperature THWth and higher than the aforementioned specific temperature THW1 and the alcohol concentration Ca is higher than the prescribed concentration Cath and lower than the aforementioned specific concentration Ca1, the CPU 62 carries out interpolation computation of the retarded angle α and the predetermined value β.

Incidentally, when the processing procedures of steps S42 and S44 are completed, the CPU 62 temporarily ends the processing procedure of step S18 in FIG. 4. Referring back to FIG. 4, the CPU 62 calculates a guard value Gaop of the angle command value aop (S20). Then, if it is determined that the angle command value aop obtained through map computation in step S18 is larger than the guard value Gaop (NO in S22), the CPU 62 identifies the angle command value aop with the guard value Gaop (S24). Then, if it is determined that the angle command value aop obtained through map computation is equal to or smaller than the guard value Gaop (YES in S22) or when the processing procedure of step S24 is completed, the CPU 62 determines whether or not the angle command value aop is equal to the retarded angle α (S26). This processing procedure is intended to determine whether to control the ignition timing to an output timing of a specific pulse of the second detection signal Sd2 or not.

Then, if it is determined that the angle command value aop is equal to the retarded angle α (YES in S26), the CPU 62 determines whether or not the second detection signal Sd2 indicates a retarded detection timing t(stan2) (S28). It should be noted herein that the retarded detection timing t(stan2) is a timing corresponding to the retarded angle α among detection timings based on the second detection signal Sd2, as shown in FIG. 3. Then, if it is determined that the retarded detection timing t(stan2) has arrived (YES in S28), the CPU 62 outputs an ignition command through the operation signal MSi (S30). Incidentally, the ignition command is a command to stop energization of an ignition coil, for example, when the ignition device 24 is of flyback type. Incidentally, in the case of flyback type, a command to start energization of the ignition coil is arbitrarily set more advanced than the angle command value aop.

In contrast, if it is determined that the angle command value aop is not equal to the retarded angle α (NO in S26), the CPU 62 determines whether or not the second detection signal Sd2 indicates a reference timing t(stan1) (S32). It should be noted herein that the reference timing t(stan1) is a timing corresponding to a reference angle θref (=α+30° BTDC) among the detection timings, as shown in FIG. 3. Then, the CPU 62 stands by until the reference timing t(stan1) arrives (NO in S32). If it is determined that the reference timing t(stan1) has arrived (S32), the CPU 62 sets a delay time Tig with respect to the reference timing t(stan1) (S34). The delay time Tig is a parameter that expresses the ignition timing designated by the angle command value aop as an elapsed time from the reference timing t(stan1).

The CPU 62 calculates and sets the delay time Tig according to an equation (c1) shown below.

$$Tig = Tref \cdot \{(30 - aop + \alpha)/30\} \quad (c1)$$

In the aforementioned equation (c1), an instantaneous rotation time Tref is a time immediately before the reference timing t(stan1) shown in FIG. 3 among the values of the instantaneous rotation time T30 that is calculated by the instantaneous rotation time calculation process unit M16 shown in FIG. 2. In the aforementioned equation (c1), the rotational speed of the crankshaft 26 at and after the reference timing t(stan1) is approximated to be identified with an average of rotational speeds at angular intervals of 30° CA to the reference angle θref That is, in this case, the delay time Tig is obtained by multiplying a ratio "(30−aop+α)/30" between a rotational angular interval from the reference angle θref to the rotational angle designated by the angle command value aop and 30° CA by the instantaneous rotation time Tref.

Then, the CPU 62 stands by until the elapsed time from the reference timing t(stan1) becomes equal to the delay time Tig (NO in S36). If the elapsed time becomes equal to the delay time Tig (YES in S36), the CPU 62 outputs an ignition command through the operation signal MSi (S30).

Figure 6:
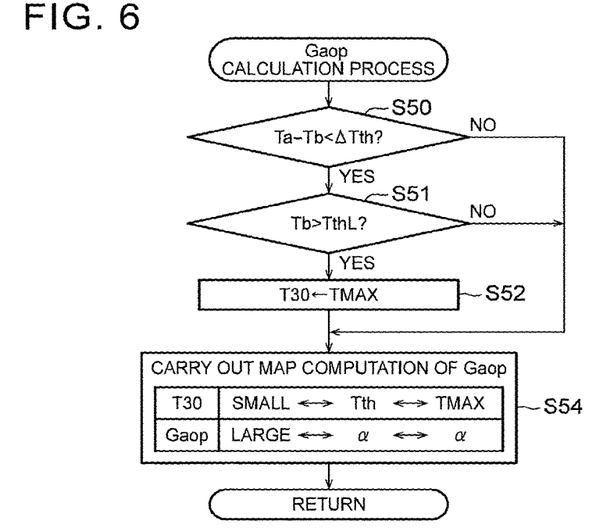
FIG. 6 is a flowchart showing a process of calculating a guard value according to the embodiment.

Incidentally, when the processing procedures of steps S12 and S30 are completed, the CPU 62 temporarily ends this series of processing procedures. FIG. 6 shows the details of the processing procedure of step S20.

In this series of processing procedures, the CPU 62 first determines whether or not a value obtained by subtracting an instantaneous rotation time Tb in a predetermined rotational angular range where the rotational speed is assumed to rise from an instantaneous rotation time Ta in a predetermined angular range before the rotational speed is assumed to rise in connection with the ignition device 24 at an immediately preceding ignition timing is smaller than a threshold ΔTth (S50). This processing procedure is intended to determine whether or not there is established a state where almost no torque is generated (whether or not a misfire has occurred) because flames do not spread to the entire air-fuel mixture through ignition at the immediately preceding ignition timing.

It should be noted herein that when the cylinder subjected to a determination on the occurrence of a misfire is regarded as a reference, the predetermined angular range before the rotational speed is assumed to rise is an angular range from "α° BTDC" to "30−α° ATDC" shown in FIG. 3, and the predetermined angular range where the rotational speed is assumed to rise is an angular range from "60−α° ATDC" to "90−α° ATDC". If no misfire has occurred, the rotational speed rises, so the instantaneous rotation time Tb is considered to become shorter than the instantaneous rotation time Ta. In contrast, when a misfire occurs, the rotational speed falls, so the instantaneous rotation time Tb is considered to become longer than the instantaneous rotation time Ta.

Then, if it is determined that the value obtained through subtraction is smaller than the threshold ΔTth (YES in S50), the CPU 62 determines that a misfire has occurred, and determines whether or not the aforementioned instantaneous rotation time Tb is longer than a threshold time TthL (S51). This processing procedure is intended to determine whether or not the angle command value aop should be limited by the misfire. It should be noted herein that the threshold time TthL is longer than a time corresponding to the predetermined rotational speed NEc. In other words, in the case where the predetermined rotational speed NEc is expressed in units of "rpm" and the threshold time TthL is expressed in units of second, "60/(TthL×12)" is a value that is lower than the predetermined rotational speed NEc. This processing procedure is provided in consideration of the fact that the starter is unlikely to be locked even when the angle command value aop is not retarded in the case where the rotational speed is high to a certain extent.

Then, if it is determined that the instantaneous rotation time Tb is longer than the threshold time TthL (YES in S51), the CPU 62 identifies the latest instantaneous rotation time T30 with a maximum assumed value TMAX (S52). It should be noted herein that the latest instantaneous rotation time T30 is the latest for the set timing t(set) in FIG. 3, which is a timing when this processing procedure is executed. The latest instantaneous rotation time T30 coincides with the instantaneous rotation time Tb in FIG. 3.

When the processing procedure of step S52 is completed or if the results of the determinations in steps S50 and S51 are negative, the CPU 62 carries out map computation of the guard value Gaop based on the instantaneous rotation time T30 (S54). It should be noted herein that the map data are stored in advance in the memory 64 and determine a relationship between each of a plurality of discrete values of the instantaneous rotation time T30 and the guard value Gaop. As shown in FIG. 6, in the map data, the guard value Gaop is an advanced value that increases as the instantaneous rotation time T30 shortens, in other words, as the rotational speed rises. This setting takes into account that since the time required for rotation by a predetermined rotation amount shortens as the rotational speed rises, the angle command value aop that is appropriate in keeping the rotational angle from becoming excessively retarded when flames sufficiently spread is advanced. Besides, this setting also takes into account that since the inertial force of the crankshaft 26 increases as the rotational speed rises, the starter is unlikely to be locked even when the angle command value aop is advanced. In the map data, the guard value Gaop is identified with the retarded angle α when the instantaneous rotation time T30 is equal to or longer than a prescribed time Tth that is shorter than the maximum assumed value TMAX. The prescribed time Tth is longer than a time corresponding to a maximum rotational speed at the time of cranking when no fuel is burned in the internal combustion engine 10 and the crankshaft 26 is dragged round by the starter motor 28.

Incidentally, when the processing procedure of step S54 is completed, the CPU 62 temporarily ends the processing procedure of step S20 in FIG. 4. The operation of the present embodiment will now be described.

Figure 7:
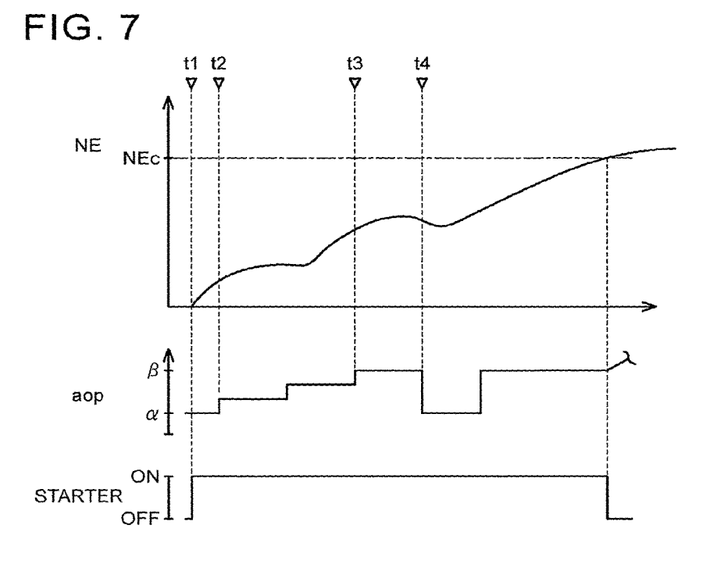
FIG. 7 is a time chart showing an example of setting an ignition timing in starting the internal combustion engine according to the embodiment.

FIG. 7 shows how the rotational speed NE, the angle command value aop and the state of the starter motor 28 change in starting the internal combustion engine 10. Incidentally, it is assumed, in an example shown in FIG. 7, that the alcohol concentration Ca is equal to or higher than the aforementioned specific concentration Ca1 that is higher than the prescribed concentration Cath, and that the coolant temperature THW is lower than the predetermined temperature THWth.

As shown in FIG. 7, the starter motor 28 is activated to start cranking at a time point t1. At and after a time point t2 when the instantaneous rotation time T30 from "120+α° BTDC" to "90+α° BTDC" in the cylinder subjected to the setting of the ignition timing becomes shorter than the prescribed time Tth, the angle command value aop is made equal to a value that is larger than the retarded angle α. Incidentally, FIG. 7 shows that the angle command value aop is a value between the retarded angle α and the predetermined value β in a period before a time point t3 when the rotational speed is low, because of the guard value Gaop of the map data that are utilized in step S54. In this case, it is revealed in FIG. 7 that the angle command value aop seems to gradually increase in three stages between the time point t2 and the time point t3. However, this is nothing more than a schematic representation of changes in the guard value Gaop and the angle command value aop on a control cycle of FIG. 4, and does not prescribe at all how long it takes until the angle command value aop reaches the predetermined time β, etc. Then, if it is determined at a time point t4 that a misfire has occurred, the angle command value aop is returned to the retarded angle α. Thus, the ignition timing is kept from being controlled through the processing procedure of step S36, based on the processing procedure of step S34 in FIG. 4.

Figure 8:
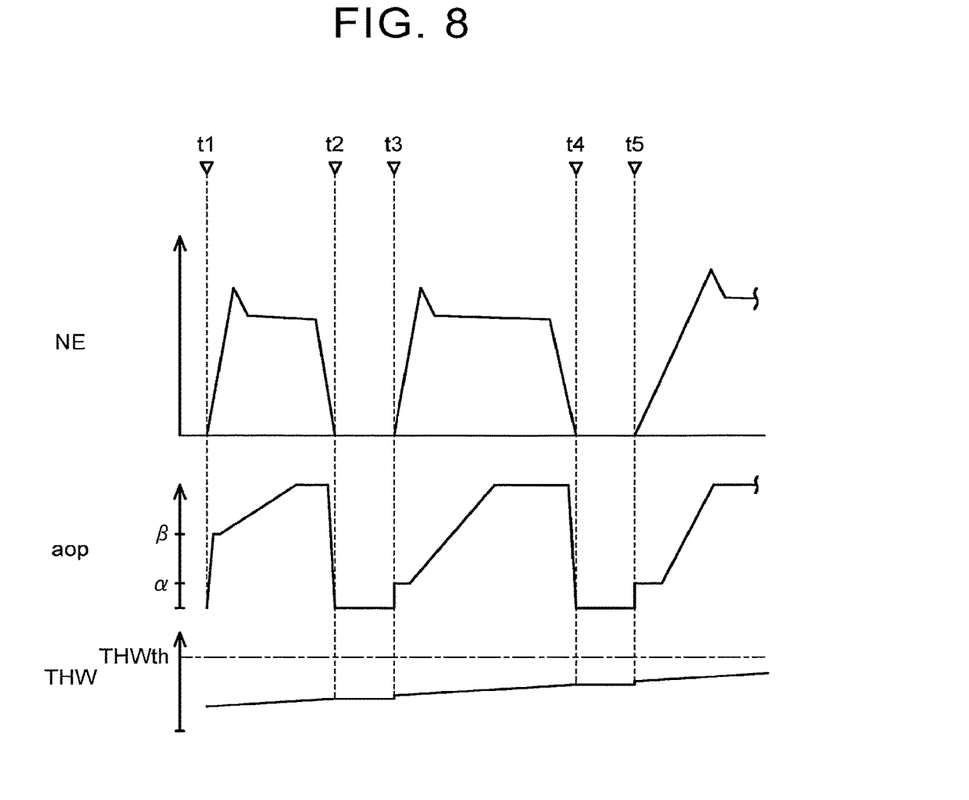
FIG. 8 is a time chart showing an example of setting the ignition timing in repeatedly starting the internal combustion engine according to the embodiment.

FIG. 8 shows how the rotational speed NE, the angle command value aop and the coolant temperature THW change in starting the internal combustion engine 10. Incidentally, it is assumed, in an example shown in FIG. 8, that the alcohol concentration Ca is equal to or higher than the aforementioned specific concentration Ca1 that is higher than the prescribed concentration Cath.

When the internal combustion engine 10 is restarted at the time point t3 upon the lapse of a relatively short time after stoppage of the internal combustion engine 10 at the time point t2, the CPU 62 sets the angle command value aop to the retarded angle α through the processing procedure of step S44 in FIG. 5. Besides, the same holds true when the internal combustion engine 10 is restarted at a time point t5 upon the lapse of a relatively short time after stoppage of the internal combustion engine 10 at the time point t4. In this manner, the angle command value aop is set to the retarded angle α when the internal combustion engine is repeatedly started.

According to the present embodiment described above, the following effects are obtained. (1) On the condition that it be determined that a misfire has occurred, the CPU 62 controls the ignition timing to the retarded detection timing t(stan2) as a detection timing of each of the tooth portions 32. Thus, the starter can be restrained from being locked through excessive advancement of the ignition timing. In particular, the delay time Tig is not used to control the ignition timing, so even in the case where the accuracy in setting the delay time Tig decreases due to a misfire, the ignition timing can be controlled without being influenced by this decrease in accuracy.

(2) On the condition that the alcohol concentration Ca be above the prescribed concentration Cath, the CPU 62 sets the angle command value aop more advanced than the retarded angle α. When the alcohol concentration Ca is equal to or lower than the prescribed concentration Cath, the CPU 62 sets the angle command value aop to the retarded angle α. Thus, when the alcohol concentration Ca is above the prescribed concentration Cath, the angle command value aop can be restrained to the utmost from being set more advanced than the retarded angle α in the case of a fuel that is likely to gasify, and hence the possibility of the starter being locked can be reduced to the utmost, while compensating for a fall in ignitability resulting from the unlikeliness of gasification of the fuel 52.

(3) When the alcohol concentration Ca is lower than the prescribed concentration Cath and the coolant temperature THW is lower than the predetermined temperature THWth, the CPU 62 sets the angle command value aop more advanced than the retarded angle α. When the coolant temperature THW is equal to or higher than the predetermined temperature THWth, the CPU 62 sets the angle command value aop to the retarded angle α. Thus, when gasification of the fuel injected from the fuel injection valve 14 is accelerated because the coolant temperature THW is high to a certain extent, the angle command value aop can be restrained to the utmost from being set more advanced than the retarded angle α, and hence the possibility of the starter being locked can be reduced to the utmost.

(4) In a period between the time point t2 and the time period t3 in FIG. 7, the amount of advancement with respect to the top dead center is made larger when the rotational speed of the crankshaft 26 is high than when the rotational speed of the crankshaft 26 is low. The time required for rotation by the predetermined rotation amount is shorter when the rotational speed is high than when the rotational speed is low. Therefore, the rotation amount is large when flames sufficiently spread. Accordingly, the risk of the starter being locked decreases even in the case where the angle command value aop is more advanced when the rotational speed is high than when the rotational speed is low. It should be noted, however, that if a misfire occurs in the case where the angle command value aop is set more advanced when the rotational speed is high, the rotational speed at the ignition timing may become lower to an excessive extent than the rotational speed in setting the angle command value aop. Then in this case, the angle command value aop is advanced for the low rotational speed. In consequence, according to the angle command value aop that is set more advanced when the rotational speed is high than when the rotational speed is low as described above, the actual ignition timing is likely to become excessively advanced when a misfire occurs. Therefore, there is an especially great merit in identifying the angle command value aop with the retarded angle α when it is determined that a misfire has occurred.

(5) When the instantaneous rotation time Tb is equal to or shorter than the threshold time TthL, the process of identifying the guard value Gaop with the retarded angle α as a result of a determination that a misfire has occurred is not executed. Thus, when the fuel 52 is unlikely to gasify, the angle command value aop can be set as advanced as possible.

(6) The product of the instantaneous rotation time Tref as the time from the advanced detection timing t(stan3) to the reference timing t(stan1) and the value obtained by dividing the angular interval (30−aop+α) between the angle command value aop and the reference angle θref by the prescribed angular interval 30° CA is identified with the delay time Tig. In this case, the rotational speed of rotation from the reference angle θref to the angle command value aop is regarded as equal to the average of the rotational speed from the advanced detection timing t(stan3) to the reference timing t(stan1). Therefore, when the rotational speed of the angular range from the reference angle θref to the angle command value aop drastically falls due to a misfire, the rotational angle upon the lapse of the delay time Tig may be located more advanced to an excessive extent than the angle command value aop. Therefore, there is an especially great merit in setting the angle command value aop to the retarded angle α at the time of a misfire.

(7) It is determined whether or not a misfire has occurred, based on the difference between the average rotational speeds (the instantaneous rotation time Ta and the instantaneous rotation time Tb) in the predetermined angular range (60−α° to 90−α° ATDC) where the rotational speed of the crankshaft 26 is assumed to rise in connection with discharge of the ignition device 24 in the cylinder subjected to a determination on the occurrence of a misfire and the predetermined angular range (α° BTDC to 30−α° ATDC) before the rotational speed of the crankshaft 26 is assumed to rise. Thus, it can be determined, based on the output of the rotational angle sensor 70, whether or not a misfire has occurred.

A corresponding relationship between the matters described in the section of "SUMMARY" and the matters in "DETAILED DESCRIPTION OF EMBODIMENTS" will be mentioned below. Besides, "the CPU 62 that executes the predetermined processing procedure(s) in accordance with the program stored in the memory 64" will be referred to hereinafter as "the CPU 62 that executes the predetermined processing procedure(s)" for the sake of simplified description.

1: The detected portions correspond to the tooth portions 32 respectively, and the detection target corresponds to the timing rotor 30. The delay time setting process unit corresponds to the CPU 62 that executes the processing procedure of step S34. The angle command value setting process unit corresponds to the CPU 62 that executes the processing procedures of steps S14 to S24. The operation process unit corresponds to the CPU 62 that executes the processing procedures of steps S26 to S36. The misfire determination process unit corresponds to the CPU 62 that executes the processing procedure of step S50. The change process unit corresponds to the CPU 62 that executes the processing procedures of steps S20 to S24. That is, in the case where the processing procedure of step S54 is executed when the results of the determinations in steps S50 and S51 are affirmative, the guard value Gaop is set to the retarded angle α. Therefore, if the angle command value aop is set more advanced than the retarded angle α, the angle command value aop is changed to a retarded value. Incidentally, at the time point t4 in FIG. 7, the process of changing the angle command value aop to the retarded angle α that is more retarded than the value at the time of a misfire (the predetermined value β) through the process of making a change to the retarded value is mentioned.

2: "The process of making a change to the retarded value" corresponds to identifying the angle command value aop with the guard value Gaop through the processing procedure of step S24 when the guard value Gaop is identified with the retarded angle α through the processing procedure of step S54 because of an affirmative determination in step S50. Besides, "the process in the case where the angle command value is equal to the retarded angle" corresponds to the process that is executed because of an affirmative determination in step S26.

3: The degree-of-ease information corresponds to the alcohol concentration Ca. The degree-of-ease information acquisition process unit corresponds to the CPU 62 that executes the processing procedure of step S14. Incidentally, "that the degree of ease of gasification is equal to or larger than the prescribed value" corresponds to the case in FIG. 5 where the alcohol concentration Ca is equal to or lower than the prescribed concentration Cath.

4: There is a correspondence to setting the angle command value aop more advanced than the retarded angle α through the map data and interpolation computation in the case in FIG. 5 where the alcohol concentration Ca is higher than the prescribed concentration Cath and the coolant temperature THW is lower than the predetermined temperature THWth, and setting the angle command value aop to the retarded angle α when the coolant temperature THW is equal to or higher than the predetermined temperature THWth.

5. "The case where the angle command value is set more advanced than the retarded angle" corresponds to the case where the angle command value aop is set more advanced than the retarded angle α in step S42 and the guard value Gaop is set more advanced than the retarded angle α in step S54. Besides, the process of making the amount of advancement with respect to the top dead center larger when the rotational speed of the crankshaft is high than when the rotational speed of the crankshaft is low is realized by the processing procedure of step S54, and corresponds to the setting of the angle command value aop in the period between the time point t2 and the time point t3 in FIG. 7.

6. The completion determination process unit corresponds to the CPU 62 that executes the processing procedure of step S10. The threshold speed is a rotational speed corresponding to the threshold time TthL, and is equal to "60/(TthL×12) rpm" when the threshold time TthL is expressed in units of second. Besides, refraining from executing "the process of making a change to the retarded value as a result of a determination that a misfire has occurred" corresponds to refraining from making a transition to the processing procedure of step S52 due to a negative determination in step S51 in spite of an affirmative determination in step S50.

7. There is a correspondence to the processing procedure of step S34. 8. The predetermined angular range before the rotational speed of the crankshaft 26 is assumed to rise corresponds to the range from "α° BTDC" to "30−α° ATDC" (the measurement range of the instantaneous rotation time Ta in FIG. 3". The predetermined angular range where the rotational speed of the crankshaft 26 is assumed to rise corresponds to the range from "60−α° ATDC" to "90−α° ATDC" (the measurement range of the instantaneous rotation time Tb in FIG. 3). Incidentally, in the processing procedure of step S50, the magnitude of the difference between the average rotational speeds in the aforementioned pair of the predetermined angular ranges is grasped as "Ta−Tb".

<Other Embodiments>Incidentally, at least one of the respective matters of the aforementioned embodiment may be modified as follows. "As regards the method of acquiring the alcohol concentration Ca" It is acceptable to equip the fuel tank or the like with an alcohol concentration sensor and acquire a detected value thereof, instead of acquiring the estimated value of the alcohol concentration Ca.

The degree-of-ease information acquisition process unit is not absolutely required to acquire the alcohol concentration Ca as the degree-of-ease information. For example, the degree-of-ease information may be information indicating whether heavy fuel or light fuel is used. It is assumed in this case that the degree of ease of gasification is smaller than the prescribed value when heavy fuel is used, and that the degree of ease of gasification is equal to or larger than the prescribed value when light fuel is used. Incidentally, it may be determined whether heavy fuel is used, for example, in accordance with the value of a sensor with which the fuel tank 50 is equipped to detect a degree of heaviness.

The predetermined angular range before the rotational speed of the crankshaft 26 is assumed to rise in connection with discharge, and the predetermined angular range where the rotational speed of the crankshaft 26 is assumed to rise are not limited to those exemplified in the aforementioned embodiment. For example, the edge of the first detection signal Sd1 may be utilized to identify the predetermined angular ranges with a range from "10−α° ATDC" to "40−α° ATDC" and a range from "50−α° ATDC" to "80−α° ATDC" respectively. Besides, for example, the rotational speed in the predetermined angular range before the rotational speed is assumed to rise in connection with discharge in the cylinder subjected to a determination on the occurrence of a misfire may be identified with the rotational speed in the predetermined angular range where the rotational speed is assumed to rise in connection with discharge in the immediately preceding cylinder.

Besides, it is not absolutely required to be determined whether or not a misfire has occurred, based on the difference between the rotational speeds in the pair of the predetermined angular ranges. For example, when the rotational speed in the predetermined angular range where the rotational speed is assumed to rise in connection with discharge in the target cylinder is equal to or lower than a threshold that is variably set in accordance with the number of times of ignition, it may be determined that a misfire has occurred. It should be noted herein that the threshold may be a value that increases as the number of times of ignition without a determination on the occurrence of a misfire increases.

It is not indispensable to determine, based on the output value (the first detection signal Sd1) of the rotational angle sensor 70, whether or not a misfire has occurred. For example, each of the cylinders may be equipped with an in-cylinder pressure sensor to determine, based on an output value thereof, whether or not a misfire has occurred. This can be realized by determining that a misfire has occurred when the degree of rise in in-cylinder pressure is low.

The retarded angle α is not limited to that exemplified in the aforementioned embodiment. For example, the retarded angle α may coincide with the top dead center or an angle that is more retarded than the top dead center by several degrees. The predetermined value β that determines a maximum amount of advancement in starting the internal combustion engine is not limited to a value between "α+30° BTDC" and "α° BTDC". For example, the predetermined value β may be equal to "α+40° BTDC". In this case, for example, when the angle command value aop is set to a value that is equal to or smaller than "α+40° BTDC" and larger than "α+30° BTDC", the ignition timing may be controlled to a timing upon the lapse of the delay time Tig from a detection timing corresponding to "α+60° BTDC". In the case where a misfire occurs when this control is performed as well, the actual ignition timing may be excessively advanced. Therefore, it is effective to change the angle command value aop to a retarded value.

Besides, when the coolant temperature THW is equal to or higher than a threshold temperature that is higher than the predetermined temperature THWth, the angle command value aop may be set more retarded than the top dead center. Incidentally, in this case, the angle command value aop that is set more retarded than the top dead center may not be identified with the rotational angle corresponding to any one of the tooth portions 32. In this case, the operation process unit may control the ignition timing in accordance with the delay time from the retarded detection timing t(stan2). Incidentally, in this case, when the ignition timing is controlled based on the delay time Tig in the cylinder subsequent to the cylinder in which a misfire has occurred in starting the internal combustion engine with the coolant temperature THW equal to or higher than the threshold temperature, the actual ignition timing can be more advanced than the timing corresponding to the angle command value aop. However, even in this case, the actual ignition timing is more retarded than the retarded detection timing t(stan2). Therefore, ignition timing control based on the delay time Tig can also be continued in the cylinder subsequent to the cylinder in which a misfire has occurred.

It is not indispensable either to set the angle command value aop in accordance with the degree of ease of gasification and the temperature of the coolant. The angle command value aop may be more advanced than the retarded angle α regardless of the coolant temperature THW when the degree of ease of gasification is smaller than the prescribed value, for example, when the alcohol concentration Ca is above the prescribed concentration Cath. It should be noted, however, that the amount of advancement in this case is desired to be newly adapted to a value at which the starter is unlikely to be locked, instead of being identified with the same amount as in the aforementioned embodiment.

The rotational speed NE may be used instead of the instantaneous rotation time T30, as a parameter indicating the rotational speed for use in setting the guard value Gaop. Furthermore, the angle command value aop may be set more advanced than the retarded angle α in starting the internal combustion engine, instead of being set based on the degree of ease of gasification. This is especially suited for a case where the internal combustion engine 10 is assumed to be employed in a region where heavy fuel is used as the fuel 52, and the like. Incidentally, in this case as well, it is effective to make the amount of advancement with respect to the top dead center larger when the rotational speed is high than when the rotational speed is low.

The aforementioned embodiment is configured such that the single parameter (the angle command value aop) is output to the operation process unit both in the case where the detection timing of each of the tooth portions 32 is identified with the ignition timing and in the case where the timing upon the lapse of the delay time from the reference timing t(stan1) is identified with the ignition timing, but the invention is not limited thereto. For example, the parameter to be used may differ depending on whether the detection timing or the timing upon the lapse of the delay time Tig is identified with the ignition timing. This can be realized by designating the number of detection timings by which a specific one of the detection timings precedes "α° BTDC", for example, when the ignition timing is identified with the specific one of the detection timings. Incidentally, in this case as well, the designated detection timing indicates a specific rotational angle, and hence is an angle command value. Besides, as described in the section of "As regards the ignition timing control apparatus", in the case where the operation process unit is configured as a dedicated piece of hardware, the input terminal of the operation process unit for the angle command value that is output from the CPU 62 may be made different depending on whether the detection timing or the timing upon the lapse of the delay time Tig is identified with the ignition timing.

In the aforementioned embodiment, if the result of the determination in step S40 is affirmative, the angle command value aop is set to the retarded angle α on the assumption that the internal combustion engine is repeatedly started, but the invention is not limited thereto. For example, the angle command value aop may be set based on a one-dimensional map of the coolant temperature THW. In this case, for example, when the coolant temperature THW is equal to or higher than a threshold temperature that is higher than the predetermined temperature THWth, the angle command value aop may be set more retarded than the top dead center.

The delay time setting process unit is not absolutely required to set the reference timing t(stan1) to "30+α° BTDC". Besides, the prescribed angular interval as the angular interval between the reference timing t(stan1) and the advanced detection timing t(stan3) is not limited to "30° CA".

Furthermore, for example, the delay time Tig may be a value obtained by multiplying the value of the left side of the aforementioned equation (c1) by "Tref2(n−1)/Tref(n−1)". It should be noted herein that the instantaneous rotation time Tref(n−1) is a time from the last advanced detection timing t(stan3) to the last reference timing t(stan1), and that the instantaneous rotation time Tref2(n−1) is a time from the last reference timing t(stan1) to the last retarded detection timing t(stan2). It should be noted herein that the last time corresponds to the cylinder in which the ignition timing arrives immediately before. "Tref2(n−1)/Tref(n−1)" is a parameter indicating a difference between a time required for rotation in the interval from "60+α° BTDC" to "30+α° BTDC" and a time required for rotation in the interval from "30+α° BTDC" to "α° BTDC".

The angle command value aop in the case where the change process unit changes the angle command value aop is not limited to the retarded angle α. For example, the first detection signal Sd1 may be utilized to control the ignition timing, and the angle command value aop may be identified with "α+10° BTDC" or "10−α° BTDC".

The change process unit is not absolutely required to control the angle command value aop to one of the detection timings. For example, the angle command value aop may be controlled to a value that is more retarded than the aforementioned retarded angle α by "1° CA". In this case as well, as long as the operation process unit controls the ignition timing based on the delay time that is set from a time point when the retarded detection timing t(stan1) is confirmed by the second detection signal Sd2, the ignition timing can be sufficiently restrained from being set to an excessively advanced value even when the setting of the delay time does not accurately reflect the rotational speed.

Furthermore, the angle command value aop is not absolutely required to be set to the retarded detection timing t(stan2), which is a detection timing more retarded than the reference angle θref, or a timing following the retarded detection timing t(stan2). For example, in the aforementioned embodiment, when it is determined that a misfire has occurred, the ignition timing may be controlled based on the delay time Tig on the assumption that the angle command value aop is equal to "α+1° BTDC". In this case as well, when the angle command value aop is identified with the predetermined value β etc. in the case where the change process unit is not provided, the starter can be restrained from being locked, by changing the angle command value aop to "α+1° BTDC".

In the processing procedure of step S51, a direct comparison in magnitude between the rotational speed NE and the threshold speed may be made through a comparison in magnitude between the instantaneous rotation time Tb and the threshold time TthL, instead of making an indirect comparison in magnitude between the rotational speed and the threshold speed. Besides, the processing procedure of step S51 may be deleted in the aforementioned embodiment. Besides, the prescribed time Tth may be set to a time corresponding to the speed across a rise in rotational speed in connection with the first ignition in starting the internal combustion engine.

The predetermined rotational speed NEc is not limited to 70 to 80% of the target rotational speed at the time of idling rotational speed control. For example, the predetermined rotational speed NEc may be a rotational speed that is lower than 70% of the target rotational speed. Incidentally, in the case where the ignition timing control apparatus is designed to control an internal combustion engine or the like that is mounted in a series hybrid vehicle, it is also possible to refrain from performing idling rotational speed control. In this case, the predetermined rotational speed NEc may be arbitrarily set etc., for example, to an appropriate value as a rotational speed for starting the control of making the actual ignition timing close to the MBT.

The detection timing for use in the control of the ignition timing is not limited to the timing when a pulse of the second detection signal Sd2 is generated. For example, the detecting timing for use in the control of the ignition timing may be a falling edge of a pulse signal as the first detection signal Sd1. Besides, in the case where the second detection signal Sd2 is utilized to control the ignition timing, it is not indispensable either to obtain the second detection signal Sd2 by thinning the pulse signals as the first detection signal Sd1. For example, the second detection signal Sd2 may be a signal obtained by subjecting a falling edge timing of the first detection signal Sd1 at intervals of 30° CA to an arbitrary correction process. In this case, the detection timing by the signal subjected to the correction process is identified with the detection timing of each of the detected portions by the rotational angle sensor.

The detected portions are not limited to the tooth portions 32. For example, a plurality of holes may be provided inside an outer periphery of the timing rotor 30, and the plurality of these holes may indicate rotational angles that are different from one another.

The ignition timing control apparatus is not limited to the configuration in which the CPU 62 executes all the processes shown in FIG. 2 in accordance with the program stored in the memory 64. For example, a dedicated piece of hardware (an application specific integrated circuit: an ASIC) may execute at least one or some of the processes shown in FIG. 2. In concrete terms, for example, the processes executed by the detection signal generation process unit M14, the instantaneous rotation time calculation process unit M16 and the rotational speed calculation process unit M18 and the processing procedures of steps S22 to S36 may be hardware processes. The CPU 62 may fetch the instantaneous rotation time T30 and the rotational speed NE, which are output by a piece of hardware, and output the angle command value aop to the piece of hardware. Incidentally, it should be noted herein that the piece of hardware to which the angle command value aop output from the CPU 62 is input constitutes the operation process unit.

Besides, for example, the signal that is output by the rotational angle sensor 70 may be a pre-waveform shaping signal, and the ignition timing control apparatus may be equipped with a piece of hardware that generates the first detection signal Sd1 from this signal. However, it is not indispensable that the process of waveform shaping be a hardware process.

The internal combustion engine to which the invention is applied is not absolutely required to be a four-cylinder internal combustion engine. For example, the invention may be applied to an internal combustion engine having five or more cylinders, such as a six-cylinder internal combustion engine, an eight-cylinder internal combustion engine or the like, or to an internal combustion engine having three or less cylinders. Besides, instead of a port injection-type valve, an in-cylinder injection-type valve may be adopted as the fuel injection valve 14. Alternatively, both a port injection-type valve and an in-cylinder injection-type valve may be provided as fuel injection valves.

Besides, the internal combustion engine is not absolutely required to be mounted in a vehicle in which the internal combustion engine is the only prime mover that applies motive power to driving wheels. For example, the internal combustion engine may be mounted in a parallel hybrid vehicle. Furthermore, the internal combustion engine may be mounted in a series hybrid vehicle.

What is claimed is:

1. An ignition timing control apparatus for an internal combustion engine, the internal combustion engine including a detection target provided with detected portions indicating a plurality of mutually different rotational angles of a crankshaft respectively, and a rotational angle sensor configured to detect a rotational angle of the crankshaft by detecting each of the detected portions, the ignition timing control apparatus comprising:
   an electronic control unit configured to
      i) set an angle command value of an ignition timing in starting the internal combustion engine,
      ii) control the ignition timing of the internal combustion engine in accordance with the angle command value by operating an ignition device of the internal combustion engine,
      iii) set a delay time of a timing in response to the rotational angle of the crankshaft becoming equal to the angle command value with respect to a reference timing, in accordance with the angle command value, the reference timing being a timing corresponding to a reference angle that is more advanced than a top dead center among timings of detection of the detected portions by the rotational angle sensor,
      iv) control the ignition timing of the internal combustion engine to a timing upon lapse of the delay time from the reference timing in response to the angle command value not coinciding with any of rotational angles corresponding to the detection timings,
      v) set the delay time based on a time interval among a plurality of the detection timings before setting the delay time,
      vi) determine whether or not a misfire has occurred in starting the internal combustion engine, and
      vii) change the angle command value of the ignition timing subsequent to detection of the misfire to a value that is more retarded than the angle command value at a time of the misfire in response to the electronic control unit determining that the misfire has occurred.

2. The ignition timing control apparatus according to claim 1, wherein
   the electronic control unit is configured to change the angle command value of the ignition timing subsequent to detection of the misfire to a value that is more retarded than the angle command value at the time of the misfire by setting the angle command value to a retarded angle, the retarded angle is a rotational angle that is determined by the detected portion that is located more retarded than the reference angle, and
   the electronic control unit is configured to control the ignition timing to a retarded detection timing as the detection timing of the retarded angle, regardless of the delay time that is set by the electronic control unit, in response to the angle command value being equal to the retarded angle.

3. The ignition timing control apparatus according to claim 2, wherein
   the electronic control unit is configured to acquire degree-of-ease information, the degree-of-ease is information indicating whether or not a degree of ease of gasification is smaller than a prescribed value, the degree of ease of gasification is an ease with which a fuel injected from a fuel injection valve of the internal combustion engine gasifies as a result of a component or components of the fuel, the degree of ease of gasification indicates that the fuel is more unlikely to gasify when the degree of ease of gasification is smaller than the prescribed value than when the degree of ease of gasification is equal to or larger than the prescribed value, the electronic control unit is configured to set the angle command value more advanced than the retarded angle on a condition that the degree of ease of gasification based on the degree-of-ease information is smaller than the prescribed value, and the electronic control unit is configured to set the angle command value to the retarded angle on a condition that the degree of ease of gasification based on the degree-of-ease information is equal to or larger than the prescribed value.

4. The ignition timing control apparatus according to claim 3, wherein the electronic control unit is configured to set the angle command value more advanced than the retarded angle in response to the degree of ease of gasification based on the degree-of-ease information being smaller than the prescribed value and a temperature of a coolant in the internal combustion engine is lower than a predetermined temperature, and the electronic control unit is configured to set the angle command value to the retarded angle on a condition that the temperature of the coolant is equal to or higher than the predetermined temperature even when the degree of ease of gasification is smaller than the prescribed value.

5. The ignition timing control apparatus according to claim 2, wherein the electronic control unit is configured to make an amount of advancement with respect to the top dead center larger based on a rotational speed of the crankshaft being high than the rotational speed of the crankshaft being low, in response to the electronic control unit setting the angle command value more advanced than the retarded angle.

6. The ignition timing control apparatus according to claim 3, wherein the electronic control unit is configured to determine that start of the internal combustion engine is completed in response to a rotational speed of the crankshaft becoming equal to or higher than a predetermined rotational speed, the electronic control unit is configured to refrain from executing a process of changing the angle command value to the more retarded value as a result of a determination that is made by the electronic control unit that a misfire has occurred, in response to the rotational speed of the crankshaft being equal to or higher than a threshold speed, and the threshold speed is lower than the predetermined rotational speed.

7. The ignition timing control apparatus according to claim 1, wherein the detection timings include an advanced detection timing as the detection timing corresponding to the detected portion that is more advanced than the reference angle by a prescribed angular interval, and the electronic control unit is configured to calculate a product of an instantaneous rotation time and a quotient as the delay time, the instantaneous rotation time is a time interval from the advanced detection timing to the reference timing, the quotient is a value obtained by dividing an angular interval between the angular command value and the reference angle by the prescribed angular interval.

8. The ignition timing control apparatus according to claim 1, wherein the electronic control unit is configured to determine whether or not a misfire has occurred, based on a difference between an average rotational speed of the crankshaft in a first predetermined angular range and an average rotational speed of the crankshaft in a second predetermined angular range, the first predetermined angular range is an angular range where the rotational speed of the crankshaft is assumed to rise in connection with discharge of the ignition device in a cylinder subjected to a determination on occurrence of a misfire, based on a detected value of a rotational angle of the crankshaft of the internal combustion engine, and the second predetermined angular range is an angular range before the rotational speed of the crankshaft is assumed to rise.

* * * * *